(12) United States Patent
Lee

(10) Patent No.: US 9,921,791 B2
(45) Date of Patent: Mar. 20, 2018

(54) WEARABLE DEVICE

(71) Applicant: Samsung Display Co., Ltd., Yongin, Gyeonggi-Do (KR)

(72) Inventor: Hyun Jae Lee, Seoul (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 252 days.

(21) Appl. No.: 14/509,902

(22) Filed: Oct. 8, 2014

(65) Prior Publication Data

US 2015/0293738 A1    Oct. 15, 2015

(30) Foreign Application Priority Data

Apr. 15, 2014    (KR) .................. 10-2014-0044980

(51) Int. Cl.
| | | |
|---|---|---|
| *G06F 1/16* | (2006.01) |
| *G06F 3/0488* | (2013.01) |
| *G06F 3/14* | (2006.01) |
| *G09G 5/00* | (2006.01) |
| *G09G 5/14* | (2006.01) |
| *G09G 5/12* | (2006.01) |

(52) U.S. Cl.
CPC ............ *G06F 3/1423* (2013.01); *G06F 1/163* (2013.01); *G06F 1/1643* (2013.01); *G06F 1/1698* (2013.01); *G06F 3/04883* (2013.01); *G06F 3/04886* (2013.01); *G09G 5/003* (2013.01); *G09G 5/12* (2013.01); *G09G 5/14* (2013.01); *G09G 2354/00* (2013.01); *G09G 2360/04* (2013.01); *G09G 2370/06* (2013.01); *G09G 2370/16* (2013.01); *G09G 2370/22* (2013.01)

(58) Field of Classification Search
CPC ............ G06F 3/04883; G06F 3/04886; G06F 1/1698; G06F 1/1643
See application file for complete search history.

(56) References Cited

U.S. PATENT DOCUMENTS

| | | | | |
|---|---|---|---|---|
| 378,099 | A | * | 2/1888 | Tanaka ...................... B66C 3/12 294/68.23 |
| 550,774 | A | * | 12/1895 | Brauer et al. ............ A24B 1/02 432/62 |
| 5,550,774 | A | * | 8/1996 | Brauer ................ G06F 12/0864 365/189.02 |

(Continued)

FOREIGN PATENT DOCUMENTS

| | | |
|---|---|---|
| JP | 2006-157725 A | 6/2006 |
| JP | 2008-204314 A | 9/2008 |

(Continued)

*Primary Examiner* — Mihir K Rayan
(74) *Attorney, Agent, or Firm* — Knobbe Martens Olson & Bear LLP

(57) ABSTRACT

A wearable device is disclosed. In one aspect, the wearable device includes a display device and a control processor. The display device includes at least one display panel including a main display area and at least one sub-display area. The display device further includes a driver integrated circuit (IC) configured to generate a signal to drive the display panel and a memory configured to store identification information of at least one device which is connected to the wearable device. The sub-display area is configured to display the identification information.

17 Claims, 12 Drawing Sheets

(56) References Cited

U.S. PATENT DOCUMENTS

| | | | |
|---|---|---|---|
| 7,030,861 B1* | 4/2006 | Westerman | G06F 3/04883 345/173 |
| 7,853,878 B2 | 12/2010 | Kim | |
| 2002/0023237 A1* | 2/2002 | Yamada | G06F 1/3209 713/323 |
| 2002/0093424 A1* | 7/2002 | Parry | G08C 17/02 340/539.1 |
| 2003/0189509 A1* | 10/2003 | Hayes | G08C 17/02 341/176 |
| 2004/0077337 A1* | 4/2004 | Vestergaard | H04L 29/06 455/414.1 |
| 2004/0103032 A1* | 5/2004 | Maggio | G06Q 30/02 705/14.2 |
| 2007/0105497 A1* | 5/2007 | Ritala | H04M 1/2745 455/41.2 |
| 2007/0187762 A1* | 8/2007 | Saiki | G02F 1/13452 257/355 |
| 2008/0186266 A1* | 8/2008 | Takahashi | G09G 3/3688 345/87 |
| 2008/0318636 A1* | 12/2008 | Kim | G06F 1/163 455/566 |
| 2009/0128447 A1* | 5/2009 | Yoshikawa | G06F 3/1431 345/1.1 |
| 2009/0239587 A1* | 9/2009 | Negron | G06F 3/04883 455/566 |
| 2010/0029327 A1* | 2/2010 | Jee | G04G 17/045 455/556.1 |
| 2010/0091002 A1* | 4/2010 | Kim | H03K 17/693 345/211 |
| 2011/0102444 A1 | 5/2011 | Matsumoto | |
| 2011/0154390 A1* | 6/2011 | Smith | H04N 21/482 725/32 |
| 2011/0298590 A1 | 12/2011 | Lee et al. | |
| 2012/0040724 A1* | 2/2012 | Kim | H04M 1/72544 455/566 |
| 2013/0050073 A1 | 2/2013 | Bae | |
| 2013/0057763 A1* | 3/2013 | Cha | G09G 5/006 348/554 |
| 2013/0088649 A1 | 4/2013 | Yum | |
| 2013/0215066 A1* | 8/2013 | Fertl | G04G 9/0064 345/173 |
| 2014/0097934 A1* | 4/2014 | Su | G08C 17/00 340/3.1 |
| 2014/0173455 A1* | 6/2014 | Shimizu | H04L 67/38 715/748 |
| 2014/0333608 A1* | 11/2014 | Okairi | G09G 3/3648 345/214 |
| 2015/0036573 A1* | 2/2015 | Malik | H04W 52/0254 370/311 |

FOREIGN PATENT DOCUMENTS

| | | |
|---|---|---|
| JP | 2012-164118 A | 8/2012 |
| KR | 10-2002-0007823 A | 1/2002 |
| KR | 10-2009-0077230 A | 7/2009 |
| KR | 10-2012-0044409 A | 5/2012 |

* cited by examiner

WEARABLE DEVICE

INCORPORATION BY REFERENCE TO ANY PRIORITY APPLICATIONS

This application claims priority to and the benefit of Korean Patent Application No. 10-2014-0044980 filed in the Korean Intellectual Property Office on Apr. 15, 2014, the entire contents of which are incorporated herein by reference.

BACKGROUND

Field

The described technology generally relates to a wearable device.

Description of the Related Technology

Wearable devices are next generation computers that are designed to be small and lightweight so as to be worn on a user's body or clothes, thereby allowing the user to freely use the device while moving. Wearable devices can be classified into portable devices such as glasses, watches, or bracelets; portable products such as smartphones; attachable devices which can be directly attached onto the skin of the user, such as a patch; and edible devices which can be directly implanted in a human body or administered into the body orally.

In the 1960's, wearable devices were initially developed as simple mounted electronic devices, for example, by attaching a calculator or a camera onto a watch or shoes. Then, as prototypes appeared in the 1980's, input/output devices having computing functions were introduced. In the early 2000's, the heat generating performance and battery performance of wearable devices and the miniaturization of terminals was extensively researched and developed. Recently, interest in wearable devices has increased and wearable devices such as Google glass, smart watches, iWatches, and Galaxy gear has been marketed.

SUMMARY OF CERTAIN INVENTIVE ASPECTS

One inventive aspect is a wearable device having the advantages of displaying identification information of another device which is connected to the wearable device.

Another aspect is a wearable device including a display device and a control processor in which the display device includes a display panel, a driver IC which generates a signal to drive the display panel, and a memory which stores identification information of a device which is connected to the wearable device.

The display device may include a main display area and a sub-display area and the sub-display area may display the identification information of the device which is connected to the wearable device.

The main display area and the sub-display area may be formed together as a single display panel.

The display device may include a plurality of display panels and the main display area and the sub-display area may be formed on different display panels.

The memory may be a nonvolatile memory.

The memory may be included in the driver IC.

The wearable device may be a smart watch or smart glasses.

The device which is connected to the wearable device may be a smartphone or a smart pad.

The display panel may use at least one display technology of the following: a liquid crystal display (LCD), an organic light emitting diode (OLED) display, and an electronic ink (E-ink).

The wearable device may further include a detecting controller which detects external contact which is performed on the sub-display area.

The detecting controller may determine a type of external contact and the type of external contact may include simple contact, drag in a first direction, and drag in a second direction.

When the detecting controller determines that the type of external contact is the simple contact, the control processor may transmit a reverse direction connection confirmation signal to the device which is connected to the wearable device.

When the detecting controller determines that the type of external contact is the drag in the first direction, the control processor may transmit an activating signal which switches a sleep mode or an idle mode into an active mode to the device which is connected to the wearable device.

The display device may include a plurality of sub-display areas and the sub-display area may display identification information and a connection channel of each of the devices which is connected to the wearable device.

The connection channel may be a general data channel or a voice channel.

When the detecting controller determines that the type of external contact is the drag in the second direction, the control processor may exchange the connection channels of the devices.

The wearable device may further include a button unit which is pressed by an external force and the control processor may transmit a signal to the device which is connected to the wearable device in accordance with duration of the external force which is applied to the button unit and the number of times of applying the external force.

The signal which is transmitted by the control processor to the device which is connected to the wearable device may be a reverse direction connection confirmation signal or an activating signal which switches a sleep mode or an idle mode into an active mode.

The display device may include a main display area and a sub-display area and the sub-display area may display a connection status of the device which is connected to the wearable device.

The display device may include a plurality of sub-display areas and the sub-display area may display connection statuses and connection channels of the devices which is connected to the wearable device.

Another aspect is a wearable device comprising a display device; and a control processor, wherein the display device includes: at least one display panel including a main display area and at least one sub-display area; a driver integrated circuit (IC) configured to generate a signal to drive the display panel; and a memory configured to store identification information of at least one device which is connected to the wearable device, wherein the sub-display area is configured to display the identification information.

The main display area and the sub-display area can be formed together on a single display panel. The display panel includes a plurality of display panels and the main display area and the sub-display area can be formed on different display panels. The memory can be a nonvolatile memory. The memory can be included in the driver IC. The wearable device can be a smart watch or smart glasses. The connected device can be a smartphone or a smart pad. The display panel can use at least one display technology of the following: a liquid crystal display (LCD) panel, an organic light-emitting diode (OLED) display panel and an electronic ink (E-ink) display panel. The wearable device can further comprise a touch input detection controller configured to detect touch input applied to the sub-display area.

The touch input detection controller can be further configured to determine whether the touch input is a simple contact, a swipe in a first direction, or a swipe in a second direction. Then the touch input detection controller determines that the touch input is the simple contact, the control processor can be further configured to transmit a connection confirmation signal to the connected device. When the touch input detection controller determines that the touch input is the swipe in the first direction, the control processor can be further configured to transmit an activation signal which signals the connected device to transition from a sleep mode or an idle mode into an active mode. The connected device can comprise a plurality of connected devices, the sub-display area includes a plurality of sub-display areas respectively corresponding to the connected devices and each of the sub-display areas can be configured to display the identification information and a connection channel of the corresponding connected device.

Another aspect is a wearable device comprising a main body including a communication module configured to receive display information and identification information from at least one external device; and a display device including a display panel having a main display area and a sub-display area, wherein the main display area is configured to display the display information, and wherein the sub-display area is configured to display the identification information.

The display device can further comprise a driver integrated circuit (IC) including a memory, the driver IC can be configured to drive the display panel and the memory can be configured to store the identification information. The external device can comprise a plurality of external devices and the sub-display area can be configured to display the identification information of each of the external devices.

The above-described wearable device according to at least one embodiment has the following advantages.

According to at least one embodiment, a memory which is provided in a display device stores identification information of a device which is connected to the wearable device and the identification information is displayed on a display panel. Accordingly, the identification information is displayed on the display panel without being controlled by a control processor of the wearable device.

Further, the identification information is displayed on the display panel of the wearable device so that security and usability of the wearable device can be improved.

DETAILED DESCRIPTION OF CERTAIN INVENTIVE EMBODIMENTS

Figure 1:
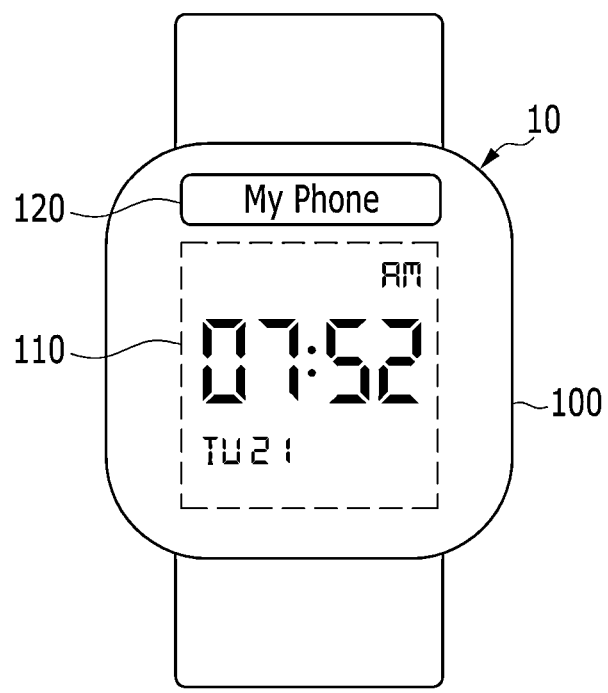
FIG. 1 is a diagram illustrating the external surface of a wearable device according to an exemplary embodiment.

When wearable devices do not display identification information for a connected or paired device to the user, security problems, such as hacking, or usability problems may arise.

Hereinafter, the described technology will be described more fully hereinafter with reference to the accompanying drawings, in which exemplary embodiments. As those skilled in the art would realize, the described embodiments may be modified in various different ways, all without departing from the spirit or scope of the described technology.

In the drawings, the thicknesses of layers, films, panels, regions, etc., may be exaggerated for the sake of clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

First, a wearable device according to an exemplary embodiment will be described below with reference to FIGS. 1 to 3.

FIG. 1 is a diagram illustrating the external surface of a wearable device according to an exemplary embodiment. FIG. 2 is a diagram illustrating the internal structure of a wearable device according to an exemplary embodiment. FIG. 3 is a diagram illustrating a wearable device according to an exemplary embodiment and other devices which are connected to the wearable device.

Figure 2:
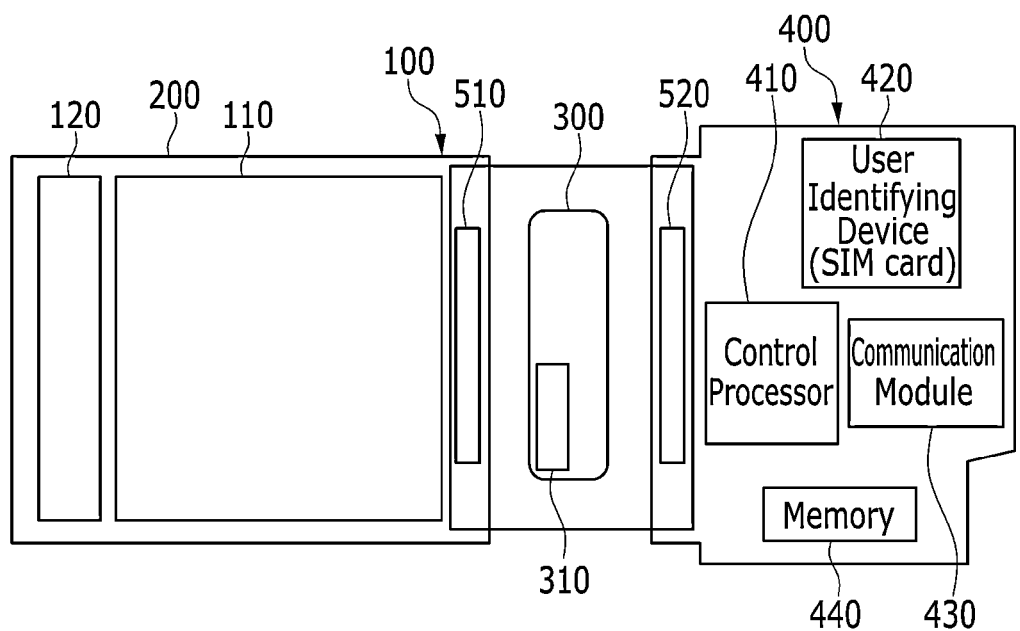
FIG. 2 is a diagram illustrating the internal structure of the wearable device of FIG. 1.

As illustrated in FIGS. 1 and 2, the wearable device 10 includes a display device 100 and a main body 400 which is connected to the display device 100. Depending on the embodiment, the wearable device 10 may be a smart watch or smart glasses, for example. Hereinafter, a smart watch will be described below as an example, but the described technology is not limited thereto and may be embodied as another type of wearable device.

The display device 100 includes, as illustrated in FIG. 1, a main display area 110 and a sub-display area 120.

The main display area 110 can usually display the time. For example, the main display area 110 can display today's date and the current time. The wearable device 10 can be connected (e.g., paired) with another device 101, as illustrated in FIG. 3. The device 101 which is connected to the wearable device 10 can be a smartphone. However, the device 101 connected to the wearable device 10 is not limited thereto, and may be another type of smart device. For example, the device 101 may be a smart pad. As described above, when the wearable device is connected to the other device, the main display area 110 can display, for example, a caller ID and call duration.

The sub-display area 120 can display identification information of the device 101 that is connected to the wearable device 10. For example, when the device 101 that is connected to the wearable device 10 has the identification information "My Phone," "My Phone" is displayed in the sub-display area 120.

The display device 100 includes a display panel 200, a driver integrated circuit (IC) 300 which generates a signal to drive the display panel 200, and a memory 310 which stores predetermined information.

The display panel 200 may use one or more display technologies such as a liquid crystal display (LCD) panel, an organic light-emitting diode (OLED) display panel, or an electronic ink (E-ink) display panel. LCD panels include two display panels in which field generating electrodes such as a pixel electrode and a common electrode are formed and a liquid crystal layer interposed between the two display panels. A voltage is applied between the field generating electrodes to generate an electric field in the liquid crystal layer which determines the alignment of liquid crystal molecules included in the liquid crystal layer and controls the polarization of incident light to display an image. OLED display panels include an organic material arranged between two electrodes and configured to recombine injected electrons and holes in the organic material so that electricity flows through a fluorescent organic compound to display an image. In electronic ink panels, when a negative voltage is applied between transparent electrode plates, millions of small capsules turn white and when a positive voltage is applied, the small capsules turn black in order display images such as characters.

In one embodiment, the main display area 110 and the sub-display area 120 is formed on one display panel 200. In an alternate embodiment, the display device 100 includes a plurality of display panels 200 and the main display area 110 and the sub-display area 120 are respectively formed on different display panels 200. In this embodiment, the display panels 200 are the same type or different types of display panels. For example, the display device 100 may include an LCD panel including the main display area 110 and an OLED display panel including the sub-display area 120.

The driver IC 300 generates a plurality of gate signals and a plurality of data signals to drive the display panel 200 and supplies these signals to the display panel 200 at an appropriate timing to drive the display panel 200.

The memory 310 stores identification information of the device 101 which is connected to the wearable device 10. When the wearable device 10 and the other device 101 are connected, the identification information is received from the other device and stored in the memory 310 of the display device 100. The identification information stored in the memory 310 is displayed on the sub-display area 120.

In some embodiments, the memory 310 is a nonvolatile memory, for example, flash memory. Therefore, even when no power is supplied to the wearable device 10, the identification information of the other device 101 stored in the memory 310 is not erased.

In some embodiments, the memory 310 is formed in the driver IC 300. However, the location of the memory 310 is not limited thereto and the memory 310 may be formed outside of the driver IC 300. That is, the memory 310 may be located anywhere in the display device 100.

In the embodiment of FIG. 2, a first connecting member 510 is formed between the display panel 200 and the driver IC 300 and the signal which is output from the driver IC 300 is transmitted to the display panel 200 via the first connecting member 510. The first connecting member may be a chip on film (COF).

The main body 400 includes a control processor or controller 410, a user identifying device (e.g., a subscriber identification module (SIM) card) 420, a communication module 430, and a memory 440.

The control processor 410 controls the overall operations of the wearable device 10. For example, when a phone call is received by the other device 101 which is connected to the wearable device 10, the control processor 410 controls the display device 100 of the wearable device 10 to display that the phone call is received. Alternatively, when a text message is received by the other device 101 which is connected to the wearable device 10, the control processor 410 controls the display device 100 of the wearable device 10 to display a part or all of the text messages.

The user identifying device 420 includes a memory and identifying device information unique to the user which is required for the wearable device 10 to connect to a communication network.

The communication module 430 is a device which forms a communication channel to connect the wearable device 10 to the other device 101 in order to exchange data between the wearable device 10 and the other device 101.

The memory 440 is in communication with the control processor 410 and a storage location which stores software code and data related to the driving and controlling of the wearable device 10. The memory 440 may be a volatile memory and/or a nonvolatile memory. The memory 440 of the main body 400 is formed separately from the memory 310 of the display device 100.

In the FIG. 2 embodiment, a second connecting member 520 is formed between the main body 400 and the display device 100 in order to exchange signals between the control processor 410 and the driver IC 300. The second connecting member 520 may be a chip on film (COF).

Hereinafter, the operation of the wearable device according to an exemplary embodiment which stores and displays identification information of the other device which is connected thereto will be described below with reference to FIG. 4.

Figure 4:
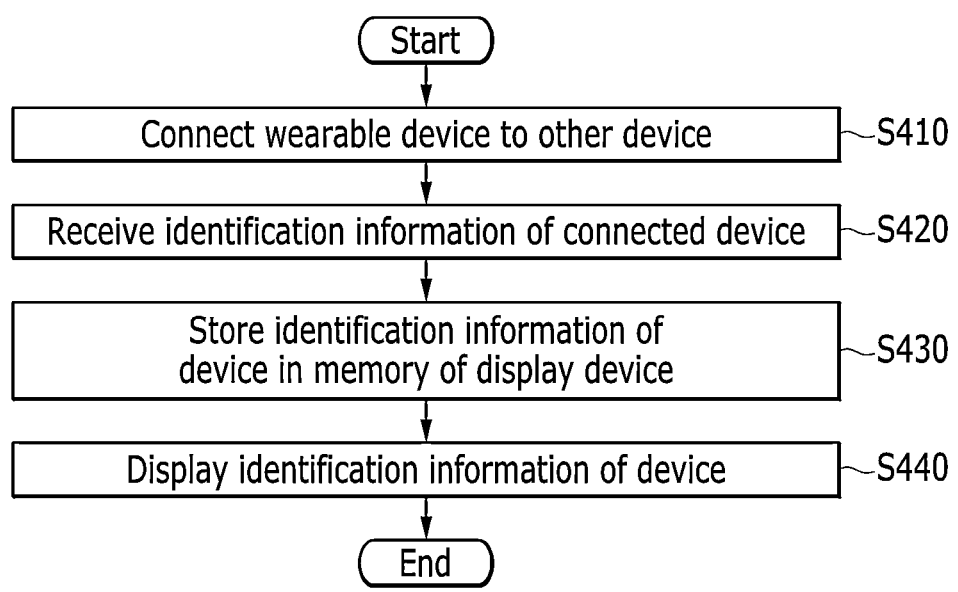
FIG. 4 is a flowchart illustrating the operation of a wearable device according to an exemplary embodiment.

FIG. 4 is a flowchart illustrating the operation of a wearable device according to an exemplary embodiment.

First, the wearable device and the other device are connected to each other in step S410. The wearable device includes a communication module so as to be connected to the other device to exchange data therebetween. The wearable device can be connected to the other device by various connection channels or standards, for example, by WiFi or Bluetooth.

The wearable device receives identification information from the other device which is connected to the wearable device in step S420. The wearable device may be a smart watch and the device which is connected to the wearable device may be a smartphone. When the smartphone transmits the identification information of "My Phone", the wearable device receives the identification information "My Phone".

The wearable device stores the identification information of the device connected to the wearable device in a memory of the wearable device in step S430. The control processor of the wearable device controls the overall operation of the wearable device and in some embodiments, the identification information of the connected device is stored in the memory of the main body. In the embodiment of FIG. 4, the identification information of the connected device is stored in the memory of the display device. The memory of the display device may be located in a driver IC of the display device.

The wearable device displays identification information of the other device which is connected to the wearable device on the sub-display area of the display device in step S440. In the embodiment of FIG. 4, the information does not need to be taken from the memory of the main body in order to display the identification information of a device which is connected to the wearable device. The identification information of the device which is connected to the wearable device is stored in the memory of the display device so that the identification information stored in the memory of the display device can be displayed. The wearable device may display "My Phone" as an identification number or label of the device which is connected to the wearable device.

Next, a wearable device according to another exemplary embodiment will be described below with reference to FIGS. 5 and 6.

Figure 3:
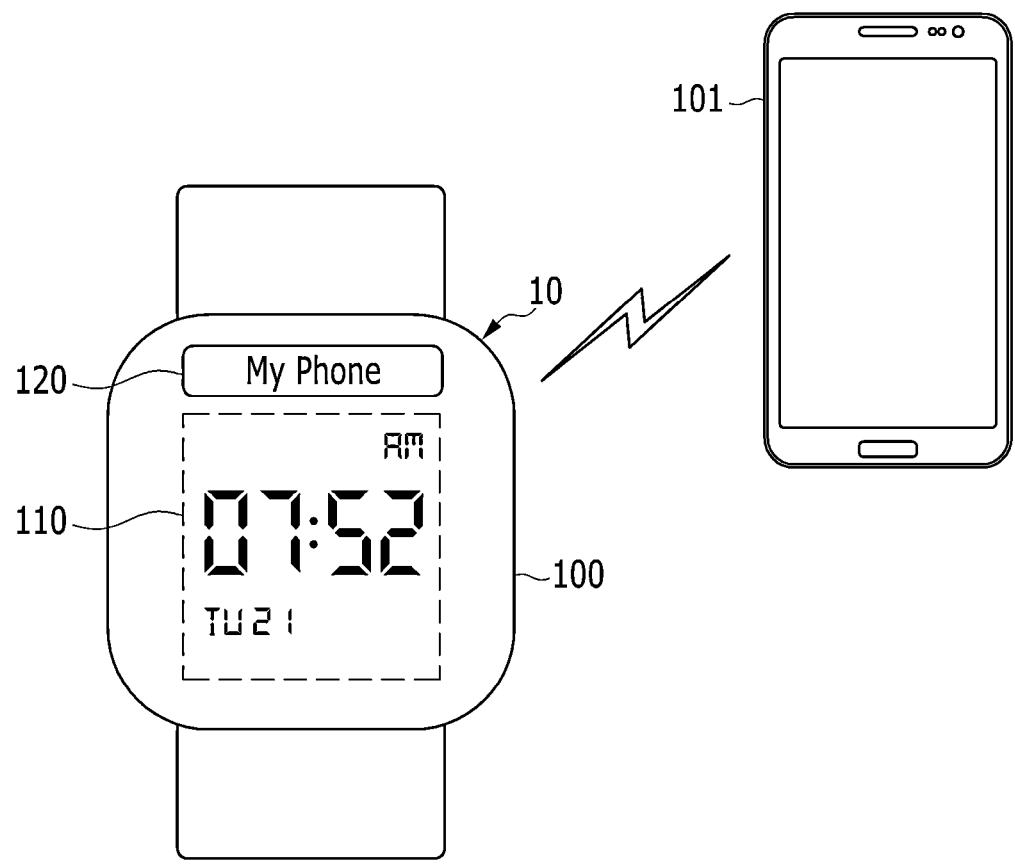
FIG. 3 is a diagram illustrating the wearable device of FIG. 1 and other devices which are connected to the wearable device.
Figure 5:
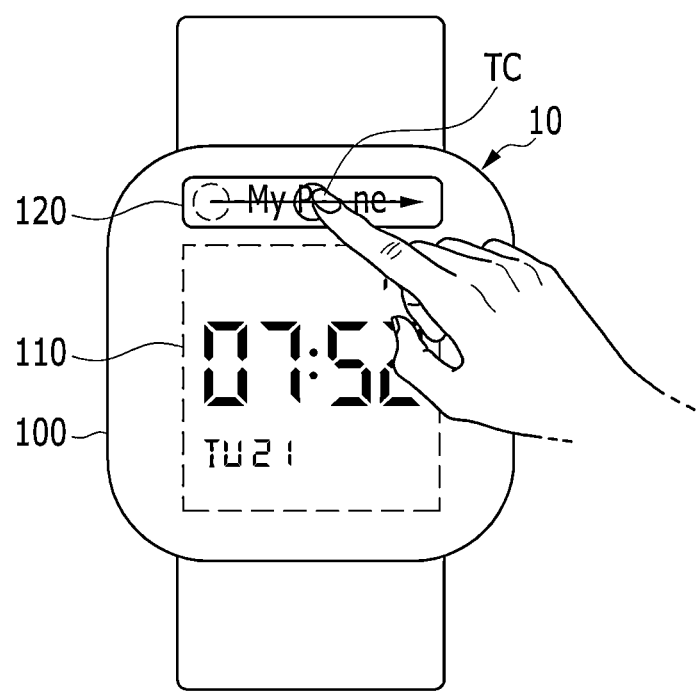
FIG. 5 is a diagram illustrating the external surface of a wearable device according to another exemplary embodiment.
Figure 6:
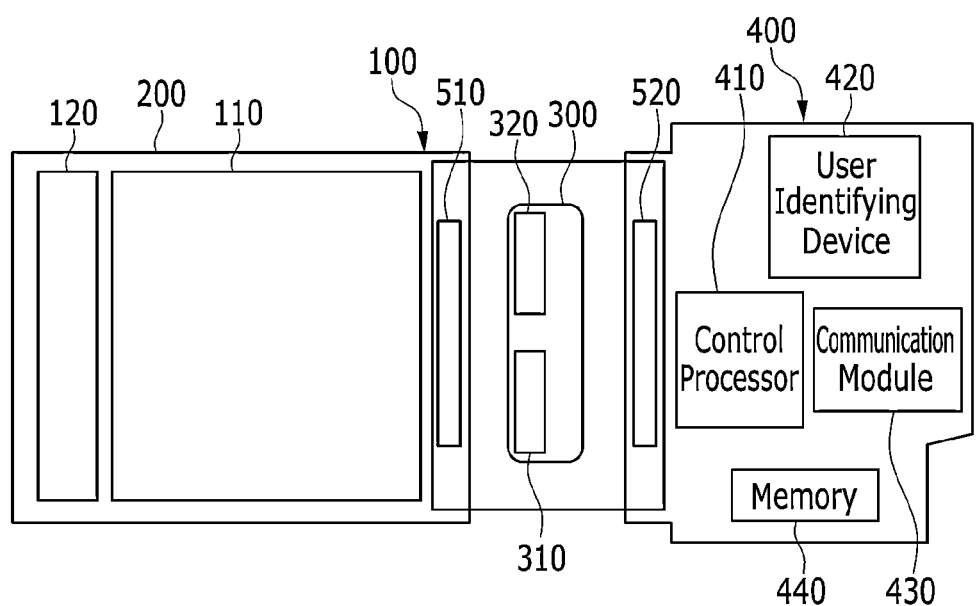
FIG. 6 is a diagram illustrating the internal structure of the wearable device of FIG. 5.

The wearable device illustrated in FIGS. 5 and 6 is significantly similar to the wearable device illustrated in FIGS. 1 to 3 and thus description of the similar portions will be omitted. The embodiment of FIGS. 5 and 6 is different from the embodiment of FIGS. 1 to 3 in that external contact or input can be detected by a portion of the wearable device which displays identification information, which will be described below in detail.

FIG. 5 is a diagram illustrating the external surface of the wearable device. FIG. 6 is a diagram illustrating the internal structure of the wearable device of FIG. 5.

As illustrated in FIGS. 5 and 6, the wearable device 10 includes a display device 100 and a main body 400 which is connected to the display device 100.

The display device 100 includes a main display area 110 and a sub-display area 120 and the sub-display area 120 displays identification information of a device which is connected to the wearable device 10.

The display device 100 includes a display panel 200, a driver IC 300 which generates a signal to drive the display panel 200, and a memory 310 which stores predetermined information. Further, the main body 400 includes a control processor 410, a user identifying device 420, a communication module 430, and a memory 440.

According to the embodiment of FIGS. 5 and 6, the display device 100 further includes a detecting controller or touch input detection controller 320 which detects external contact or touch input applied to the sub-display area 120.

The display panel 200 includes a touch panel and the detecting controller 320 determines the position and the type of the external contact applied to the display panel 200. Particularly, the detecting controller 320 detects the external contact applied to the sub-display area 120 which displays the identification information of the device which is connected to the wearable device 10.

The detecting controller 320 can determine whether the external contact is simple contact (e.g., touch or tap input) or a drag in a first direction (e.g., swipe input). When the detecting controller 320 determines that the type of external contact is simple contact, the detecting controller 320 transmits the information to the control processor 410. When the control processor 410 receives information indicating that simple contact is applied to the sub-display area 120, the control processor 410 transmits a reverse direction connection confirmation signal or connection confirmation signal to the device that is connected to the wearable device 10. The device which receives the reverse direction connection confirmation signal can notify the user that the device is connected to the wearable device 10 through communications such as vibration, sound, or screen flickering.

When the detecting controller 320 determines that the type of external contact is the drag in a first direction, the detecting controller 320 transmits the information to the control processor 410. The first direction may be a horizontal direction. When the control processor 410 receives information indicating that the drag in the first direction is applied to the sub-display area 120, the control processor 410 can transmit an activating signal or activation signal to the device which is connected to the wearable device 10. The activating signal is a signal which switches the connected device from a sleep mode or an idle mode into an active mode. Sleep mode refers to a status where the device is switched into a low power status when the device is not used and the idle mode refers to a status where only basic applications which initiated by the device are run. That is, the sleep mode and the idle mode are types of standby modes for reducing power consumption of the connected device. When the device which is connected to the wearable device 10 is in the sleep mode or the idle mode and the activating signal is transmitted thereto, the connected device is switched into the active mode.

In the above description, even though it is described that the type of external contact includes the simple contact and the drag in the first direction, these are only example inputs and the described technology is not limited thereto. There may be various types of external contact depending on the number of individual contacts and duration between a plurality of contacts.

Further, the above described signal transmitted from the control processor and the operation of the device which is connected to the wearable device are merely examples and the described technology is not limited thereto. The type of signal which is transmitted from the control processor may be variously changed depending on the type of external contact or input and thus the operation of a device which receives the signal from the control processor may be correspondingly changed.

Hereinafter, the operation of a wearable device according to an exemplary embodiment which detects external contact and transmits a signal to the connected device will be described below with reference to FIG. 7.

Figure 7:
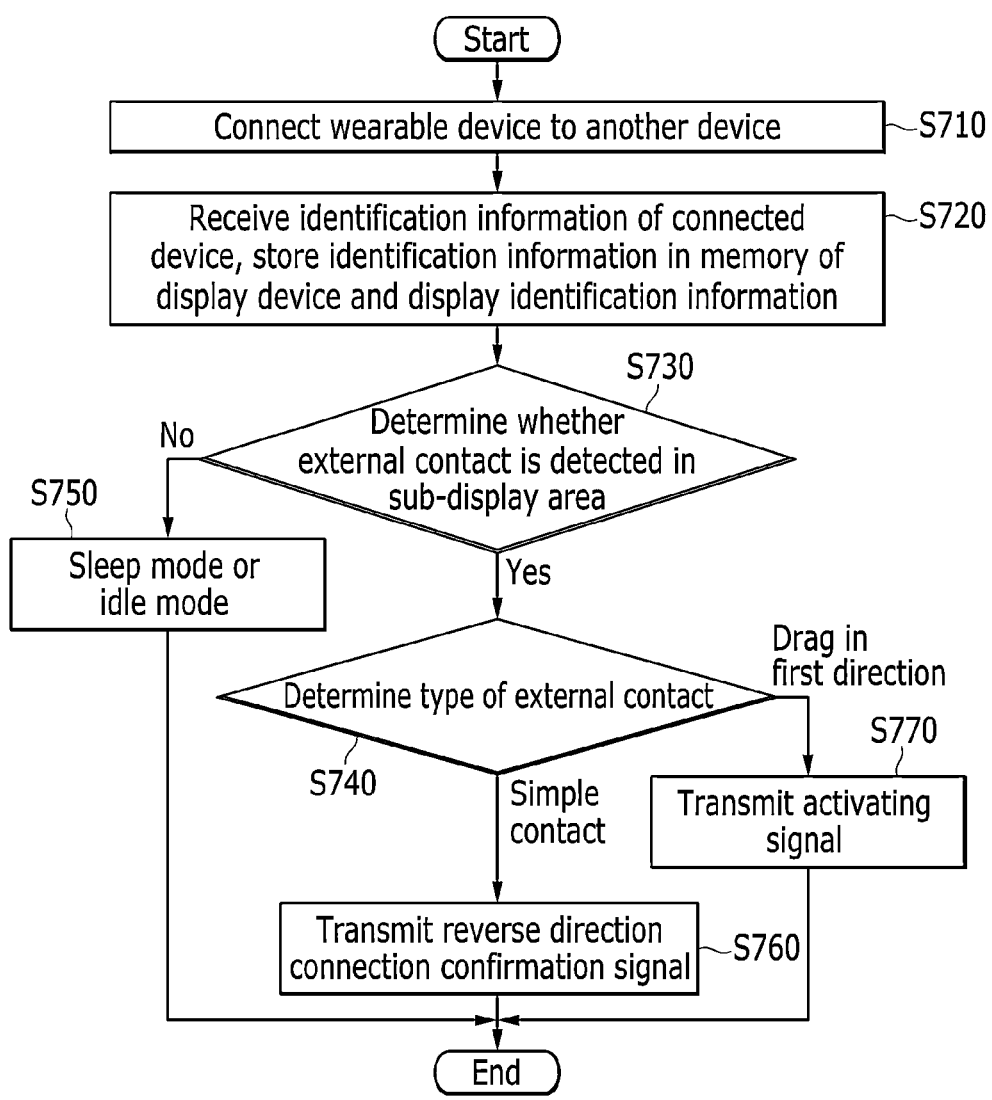
FIG. 7 is a flowchart illustrating the operation of a wearable device according to an exemplary embodiment.

FIG. 7 is a flowchart illustrating the operation of a wearable device according to an exemplary embodiment.

First, the wearable device and another device are connected in step S710. The wearable device can be connected to the other device by various communication methods.

The wearable device receives identification information from the connected device, stores the identification information in a memory of a display device and displays the identification information in step S720. The identification information of the device which is connected to the wearable device can be displayed on a sub-display area of the display device of the wearable device.

In step S730, it is determined whether external contact is detected in the sub-display area of the display device of the wearable device.

When the external contact is detected, the detecting controller of the wearable device determines the type of external contact in step S740. The external contact can include simple contact or drag in the first direction.

When it is determined that the type of external contact is simple contact, the detecting controller transmits this information to the control processor. The control processor can transmit a reverse direction connection confirmation signal to the device which is connected to the wearable device 10 in step S760. The device which receives the reverse direction connection confirmation signal can notify the user that the device is connected to the wearable device 10 through communications such as vibration, sound, or screen flickering.

When it is determined that the type of external contact is a drag in a first direction, the detecting controller transmits this information to the control processor. The control processor can transmit an activating signal to the device which is connected to the wearable device 10 in step S770. The device which receives the activating signal is switched from a standby mode such as a sleep mode or an idle mode into an active mode.

When no external contact is detected within a predetermined time, the wearable device may not transmit a separate signal to the device which is connected to thereto. Thereafter, the device which is connected to the wearable device can be switched into the sleep mode or the idle mode in step S750.

Next, a wearable device according to an exemplary embodiment will be described below with reference to FIGS. 8 and 9.

Figure 8:
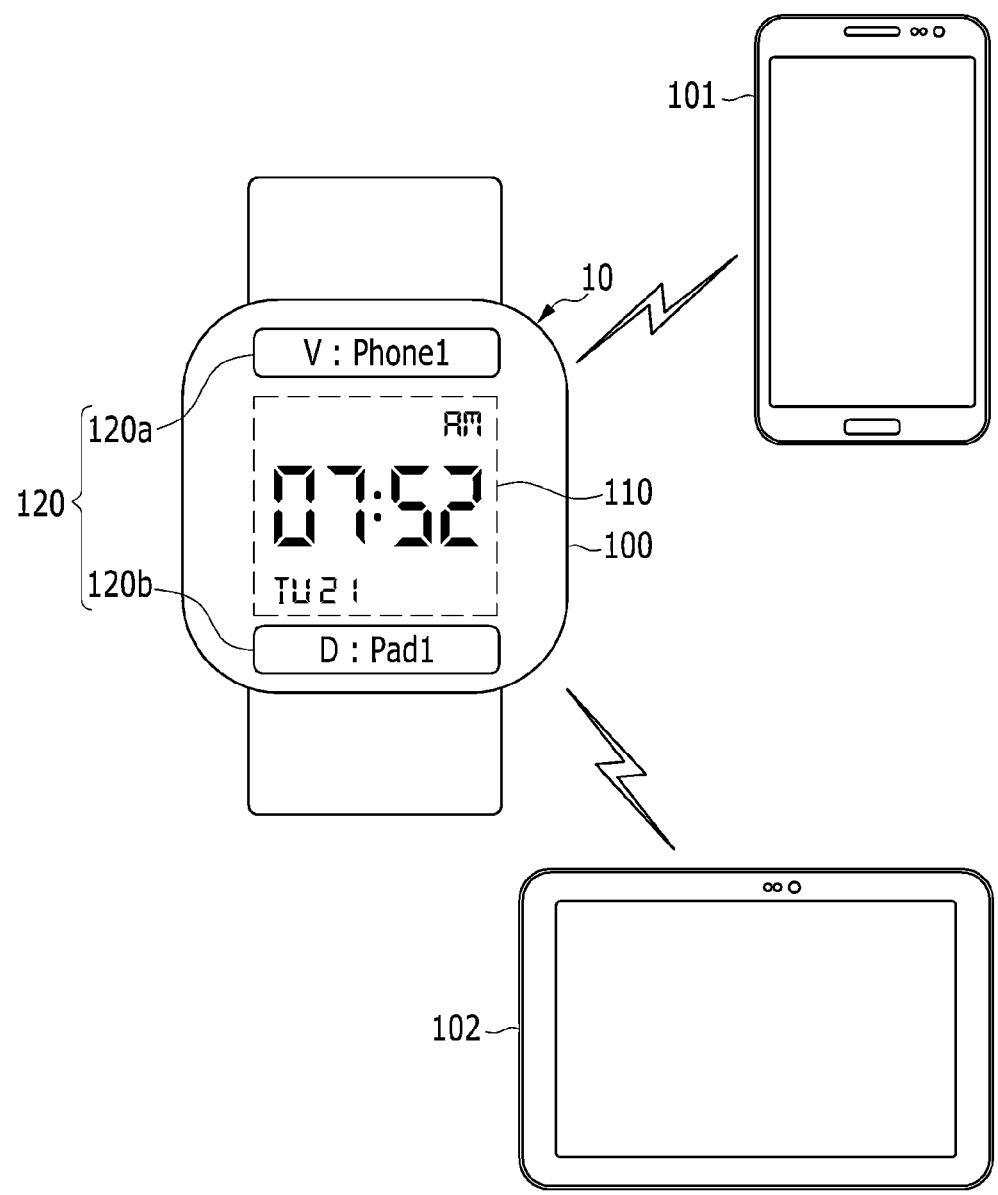
FIG. 8 is a diagram illustrating a wearable device and a plurality of other devices which are connected to the wearable device according to an exemplary embodiment.
Figure 9:
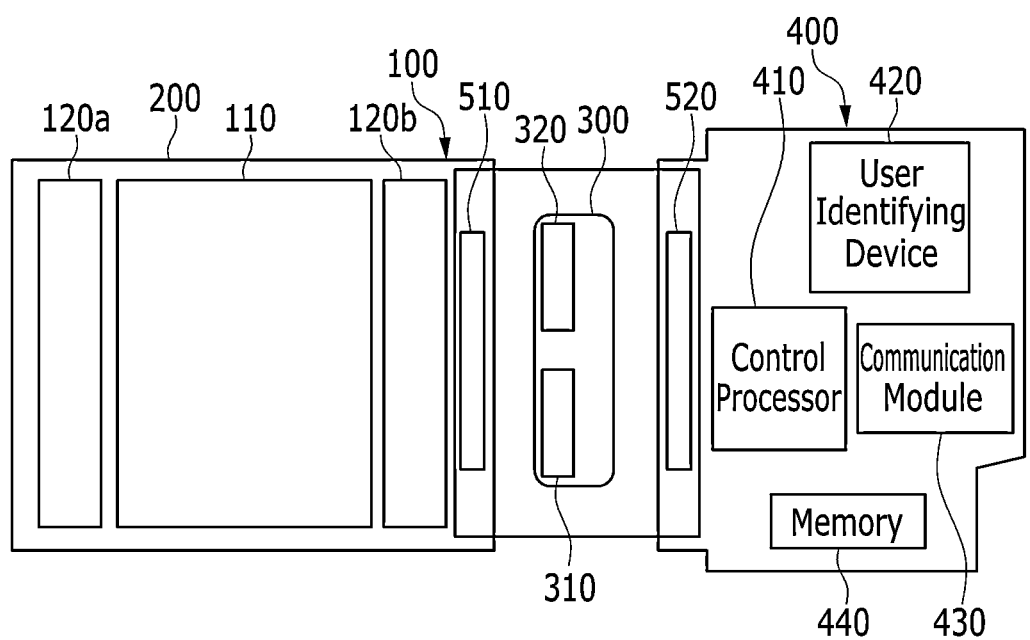
FIG. 9 is a diagram illustrating the internal structure of the wearable device of FIG. 8.

The display device illustrated in FIGS. 8 and 9 is significantly similar to the display device according to the exemplary embodiment illustrated in FIGS. 5 and 6 and thus description of the similar portions will be omitted. The embodiment of FIGS. 8 and 9 is different from the embodiment of FIGS. 5 and 6 in that the wearable device is connected to a plurality of devices, which will be described below in detail.

FIG. 8 is a diagram illustrating a wearable device and a plurality of other devices which are connected to the wearable device according to an exemplary embodiment. FIG. 9 is a diagram illustrating the internal structure of the wearable device of FIG. 8.

As illustrated in FIGS. 8 and 9, the wearable device 10 includes a display device 100 and a main body 400 which is connected to the display device 100.

The display device 100 includes a display panel 200, a driver IC 300 which generates a signal to drive the display panel 200, and a memory 310 which stores predetermined information. Further, the main body 400 includes a control processor 410, a user identifying device 420, a communication module 430, and a memory 440.

The display device 100 includes a main display area 110 and a sub-display area 120. In the embodiment of FIGS. 8 and 9, the sub-display area 120 includes a first sub-display area 120*a* and a second sub-display area 120*b*. The sub-display area 120 displays identification information of a device which is connected to the wearable device 10. The first and second sub-display areas 120*a* and 120*b* display identification information of different connected devices.

The wearable device 10 can be connected to two devices 101 and 102. For example, the wearable device 10 which is a smart watch can be connected to a first device 101 which is a smartphone and a second device 102 which is a smart pad or tabled computer.

Various connection channels can be formed between the wearable device 10 and the devices 101 and 102. For example, the wearable device 10 can be connected to the first device 101 by Bluetooth and a voice channel can be formed between the wearable device 10 and the first device 101. The wearable device 10 can be connected to the second device 102 by WiFi and a general data channel can be formed between the wearable device 10 and the second device 102.

The memory 310 of the display device 100 can store not only the identification information of the devices 101 and 102 which are connected to the wearable device 10 but also information relating to the connection channel. When the wearable device 10 is connected to the devices 101 and 102, identification information and information relating to the connection channel are transmitted from the devices 101 and 102 and stored in the memory 310 of the display device 100.

Therefore, in addition to the identification information of the connected devices 101 and 102, the connection channel can also be displayed in the sub-display area 120. For example, the first sub-display area 120*a* can display "Phone1" which is identification information of the first device 101 which is connected to the wearable device 10 together with "V" which is an abbreviation of a voice channel which is the connection channel. Further, the second sub-display area 120*b* can display "Pad1" which is identification information of the second device 102 which is connected to the wearable device 10 together with "D" which is an abbreviation of the general data channel which is the connection channel.

In the above description, even though the display device of the wearable device includes two sub-display areas, the described technology is not limited thereto. The display device can include three or more sub-display areas. When the wearable device is connected to three or more devices, identification information of the devices and the connection channels can be displayed by the different sub-display areas. In some embodiments, the sub-display areas are not separately formed and the identification information for the plurality of devices and the connection channels can be displayed together in one sub-display area.

The display device 100 of the wearable device 10 according to the embodiment of FIGS. 8 and 9 may further include a detecting controller 320 which detects external contact which is applied to the sub-display area 120. The detecting controller 320 can detect the external contact which is applied to the sub-display area 120 which displays the identification information of the device which is connected to the wearable device 10 and determine the type of the external contact. The external contact may include simple contact, drag in a first direction, and drag in a second direction.

When the detecting controller 320 determines that the type of external contact is simple contact, the detecting controller 320 transmits the information to the control processor 410 and the control processor 410 can transmit a reverse direction connection confirmation signal to the device which is connected to the wearable device 10.

When the detecting controller 320 determines that the type of external contact is the drag in the first direction, the detecting controller 320 transmits the information to the control processor 410 and the control processor 410 can transmit an activating signal to the device which is connected to the wearable device 10. The first direction may be a horizontal direction.

When the detecting controller 320 determines that the type of external contact is the drag in the second direction, the detecting controller 320 transmits the information to the control processor 410 and the control processor 410 exchanges the connection channels between the first device 101 and the second device 102. The second direction may be a vertical direction. The control processor 410 can control a change in the connection channel between the wearable device 10 and the first device 101 from a voice channel into a general data channel and a change the connection channel between the wearable device 10 and the second device 102 from the general data channel into the voice channel.

Hereinafter, the operation of a wearable device which stores and displays identification information of a plurality of devices which are connected thereto according to an exemplary embodiment will be described below with reference to FIG. 10.

Figure 10:
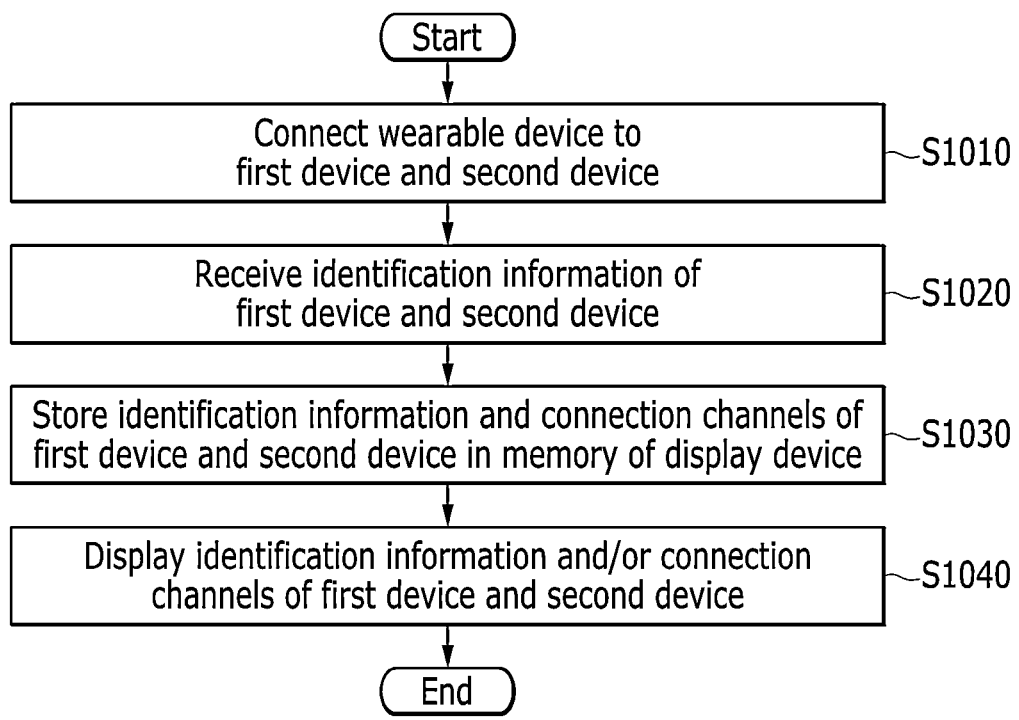
FIG. 10 is a flowchart illustrating the operation of a wearable device according to an exemplary embodiment.

FIG. 10 is a flowchart illustrating the operation of a wearable device according to an exemplary embodiment.

First, a wearable device and a plurality of devices are connected in step S1010. The wearable device is connected to a first device and a second device. The wearable device can be connected to a plurality of devices by various connection channels, for example, by WiFi or Bluetooth.

The wearable device receives identification information from the devices which are connected thereto in step S1020. The wearable device may be a smart watch, the first device connected to the wearable device may be a smartphone, and the second device may be a smart pad. When the first device transmits the identification information "Phone1" and the second device transmits the identification information "Pad1", the wearable receives the information.

The wearable device stores the identification information of the connected devices in a memory of a display device in step S1030. In addition to the identification information of the connected devices, the memory also stores information on the respective connection channels.

The wearable device displays the identification information of the connected devices in a sub-display area of the display device in step S1040. The identification information of the devices can be displayed in different sub-display areas. Further, the connection channels can also be displayed together with the identification information of the connected devices.

Next, a wearable device according to yet another exemplary embodiment will be described below with reference to FIG. 11.

Figure 11:
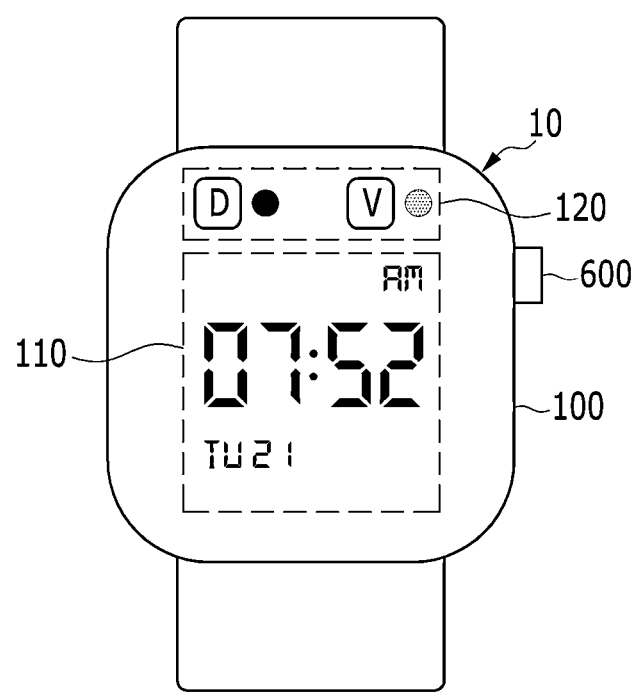
FIG. 11 is a diagram illustrating the external surface of a wearable device according to an exemplary embodiment.

The wearable device illustrated in FIG. 11 is significantly similar to the wearable device according to the embodiment illustrated in FIGS. 8 and 9 and thus description of the similar portions will be omitted. The embodiment of FIG. 11 is different from the embodiment of FIGS. 8 and 9 in that only the connection status of a device which is connected to the wearable device is displayed, which will be described below in detail.

FIG. 11 is a diagram illustrating an external surface of a wearable device according to an exemplary embodiment.

As illustrated in FIG. 11, the wearable device 10 includes a display device 100 and the display device 100 includes a main display area 110 and a sub-display area 120.

The sub-display area 120 displays the connection status of a device which is connected to the wearable device 10. In the embodiment of FIGS. 8 and 9, the identification information of the device which is connected to the wearable device 10 is displayed, but in the embodiment of FIG. 11, only the connection status is displayed. For example, when the wearable device is connected to two devices, the connection status can be displayed by two circles. The two devices can be distinguished by the pattern or color of the two circles.

The sub-display area 120 can further display the connection channel of a device which is connected to the wearable device 10. For example, "D" can be the abbreviation of a general data channel and "V" can be the abbreviation of a voice channel.

The wearable device 10 further includes a button unit 600. The button unit 600 protrudes at a side of the display device and can be pressed by an external force. The shape or the location of the button unit 600 is not limited to the above description and various modifications can be made thereto. Further, the button unit 600 is not limited to a physical button and can be implemented as a soft key.

Even though not illustrated, similarly to the above-described embodiment of FIGS. 8 and 9, the wearable device 10 includes a control processor. The control processor transmits a predetermined signal to the device which is connected to the wearable device 10 in accordance with the number and duration of the external force(s) applied to the button unit 600. For example, when the button unit 600 is pressed shortly or for a long time period can be distinguished and the control processor can transmit different signals for each category of input. Alternatively, when the button unit 600 is pressed once or twice can be distinguished and the control processor can transmit different signals based on the number of presses. The signal which is transmitted by the control processor to the connected device can be a reverse direction connection confirmation signal or an activating signal which switches the connected device from a sleep mode or an idle mode into an active mode. Alternatively, the control processor can exchange the connection channels of the devices.

Hereinafter, the operation of a wearable device which displays the connection status of a plurality of devices which are connected thereto according to an exemplary embodiment will be described below with reference to FIG. 12.

Figure 12:
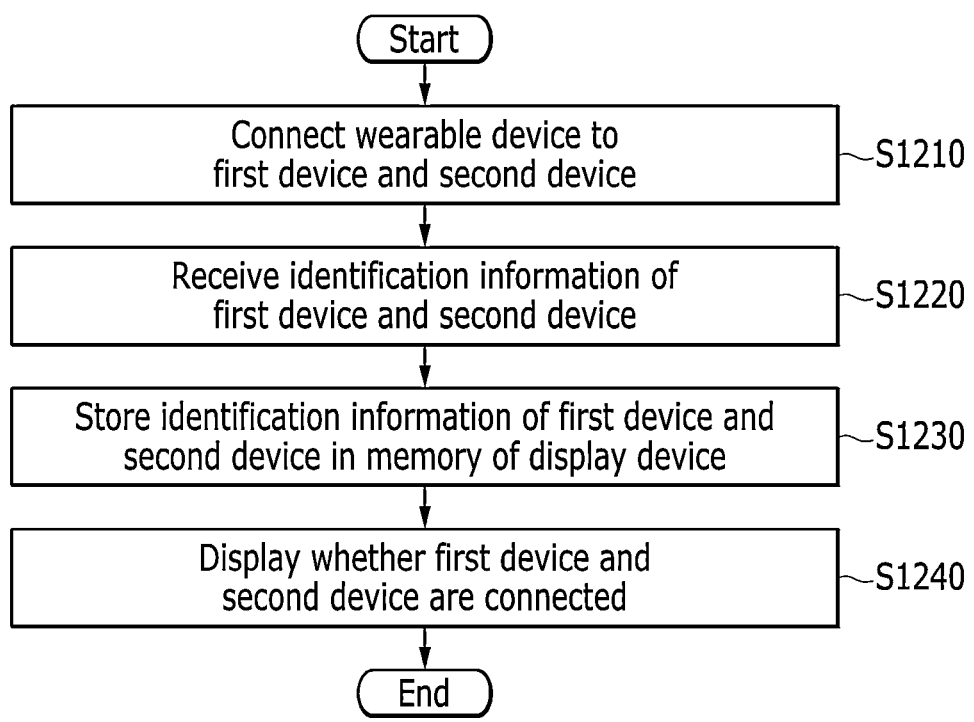
FIG. 12 is a flowchart illustrating the operation of a wearable device according to an exemplary embodiment.

FIG. 12 is a flowchart illustrating the operation of a wearable device according to an exemplary embodiment.

First, a wearable device and a plurality of devices are connected in step S1210. The wearable device is connected to a first device and a second device.

The wearable device receives identification information from the devices which are connected thereto in step S1220.

The wearable device stores the identification information of the connected devices in a memory of a display device in step S1230. In addition to the identification information of the connected devices, the memory can also store information on the connection channels of the connected devices.

The wearable device displays the connection statuses of the connected devices in a sub-display area of the display device in step S1240. The wearable device can also display the connection channels in the sub-display area of the display device in step S1240.

The memory of the display device of the wearable device stores the identification information of the devices. Accordingly, the identification information of the connected devices can be temporally displayed in the sub-display area in accordance with an external force applied to a button unit or contacting the sub-display area. For example, when the button unit is quickly pressed once while displaying the connection status of the connected devices in the sub-display area of the display device, the identification information of the first device can be displayed for approximately for five seconds. Further, when the button unit is quickly pressed again, the identification information of the second device can be displayed approximately for five seconds.

While the inventive technology has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A wearable device, comprising:
   a display device; and
   a main body including a communication module configured to receive display information and identification information from at least one external device and a control processor,
   wherein the display device includes:
      at least one display panel including a main display area and at least one sub-display area; and
      a driver integrated circuit (IC) configured to generate a signal to drive the display panel,
      wherein the driver integrated circuit (IC) includes a memory configured to store the identification information of the at least one external device which is connected to the wearable device, the identification information uniquely identifying the at least one external device, and
      wherein each sub-display area corresponds to a connected device and is configured to display the identification information, a connection status, and a connection channel of the corresponding connected device.

2. The wearable device of claim 1, wherein the main display area and the sub-display area are formed together on a single display panel.

3. The wearable device of claim 1, wherein the display panel includes a plurality of display panels and wherein the main display area and the sub-display area are formed on different display panels.

4. The wearable device of claim 1, wherein the memory is a nonvolatile memory.

5. The wearable device of claim 1, wherein the wearable device is a smart watch or smart glasses, and the connected device is a smartphone or a smart pad.

6. The wearable device of claim 1, wherein the display panel uses at least one display technology of the following: a liquid crystal display (LCD) panel, an organic light-emitting diode (OLED) display panel and an electronic ink (E-ink) display panel.

7. The wearable device of claim 1, further comprising a touch input detection controller configured to detect touch input applied to the sub-display area.

8. The wearable device of claim 7, wherein the touch input detection controller is further configured to determine whether the touch input is a simple contact, a swipe in a first direction, or a swipe in a second direction.

9. The wearable device of claim 8, wherein when the touch input detection controller determines that the touch input is the simple contact, the control processor is further configured to transmit a connection confirmation signal to the connected device.

10. The wearable device of claim 8, wherein when the touch input detection controller determines that the touch input is the swipe in the first direction, the control processor is further configured to transmit an activation signal which signals the corresponding connected device to transition from a sleep mode or an idle mode into an active mode.

11. The wearable device of claim 8, wherein the connected device comprises a plurality of connected devices, wherein the sub-display area includes a plurality of sub-display areas respectively corresponding to the connected devices and wherein each of the sub-display areas is configured to display the identification information and a connection channel of the corresponding connected device.

12. The wearable device of claim 11, wherein the connection channel is one of a general data channel and a voice channel.

13. The wearable device of claim 12, wherein when the touch input detection controller determines that the touch input is the swipe in the second direction, the control processor is further configured to exchange the connection channels of the connected devices.

14. The wearable device of claim 1, further comprising a button configured to be pressed by an external force, wherein the control processor is further configured to transmit a signal to the connected device in accordance with the number and duration of the external force(s) applied to the button.

15. The wearable device of claim 14, wherein the signal is a connection confirmation signal or an activation signal which signals the connected device to transition from a sleep mode or an idle mode into an active mode.

16. The wearable device of claim 1, wherein the connected device comprises a plurality of connected devices, and wherein the sub-display area includes a plurality of sub-display areas respectively corresponding to the connected devices.

17. The wearable device of claim 1, wherein the main display area is configured to display the display information.

* * * * *